US010522825B2

(12) United States Patent
Kim et al.

(10) Patent No.: US 10,522,825 B2
(45) Date of Patent: Dec. 31, 2019

(54) CATHODE ACTIVE MATERIAL AND CATHODE COMPRISING METAL NANO PARTICLES, AND LITHIUM-SULFUR BATTERY COMPRISING SAME

(71) Applicant: LG CHEM, LTD., Seoul (KR)

(72) Inventors: Yun Kyoung Kim, Daejeon (KR); Doo Kyung Yang, Daejeon (KR); Dong Wook Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 118 days.

(21) Appl. No.: 15/555,237

(22) PCT Filed: Sep. 23, 2016

(86) PCT No.: PCT/KR2016/010610
§ 371 (c)(1),
(2) Date: Sep. 1, 2017

(87) PCT Pub. No.: WO2017/052246
PCT Pub. Date: Mar. 30, 2017

(65) Prior Publication Data
US 2018/0019465 A1 Jan. 18, 2018

(30) Foreign Application Priority Data

Sep. 23, 2015 (KR) .................. 10-2015-0134594
Sep. 22, 2016 (KR) .................. 10-2016-0121705

(51) Int. Cl.
*H01M 4/36* (2006.01)
*H01M 4/38* (2006.01)
(Continued)

(52) U.S. Cl.
CPC .......... *H01M 4/366* (2013.01); *H01M 4/133* (2013.01); *H01M 4/38* (2013.01); *H01M 4/623* (2013.01);
(Continued)

(58) Field of Classification Search
CPC ...... H01M 4/366; H01M 4/133; H01M 4/136; H01M 4/38; H01M 4/581; H01M 4/60;
(Continued)

(56) References Cited

U.S. PATENT DOCUMENTS 5,919,587 A * 7/1999 Mukherjee ............... H01B 1/12
429/213
7,029,796 B2 * 4/2006 Choi ..................... H01M 4/136
252/182.1
(Continued)

FOREIGN PATENT DOCUMENTS

CN 105098143 A 11/2015
EP 2 717 365 A2 4/2014
(Continued)

OTHER PUBLICATIONS

Encyclopedia Britannica, Complex (in chemistry), Britannica Online Encyclopedia, https://www.britannica.com/science/complex-in-chemistry, down loaded Oct. 8, 2019. (Year: 2011).*
(Continued)

*Primary Examiner* — Jayne L Mershon
(74) *Attorney, Agent, or Firm* — Birch, Stewart, Kolasch & Birch, LLP

(57) ABSTRACT

The present disclosure relates to a positive electrode active material and a positive electrode comprising metal nano particles, and a lithium-sulfur battery comprising the same, and in particular, to a positive electrode for a lithium-sulfur battery comprising a positive electrode active material of a sulfur-metal catalyst-carbon composite, and a lithium-sulfur battery comprising the same. The lithium-sulfur battery using a positive electrode comprising metal nano particles according to the present disclosure increases reactivity of sulfur, a positive electrode active material, and increases electrical conductivity of an electrode by the dispersion of the metal nano particles in the electrode so as to increase
(Continued)

reactivity and electric capacity of the positive electrode. In addition, battery reaction products such as lithium sulfide ($Li_2S$) are readily decomposed by a catalyst reaction, and therefore, lifespan characteristics can be improved.

14 Claims, 6 Drawing Sheets

(51) Int. Cl.
H01M 4/133 (2010.01)
H01M 4/62 (2006.01)
H01M 4/66 (2006.01)
H01M 10/0525 (2010.01)
H01M 4/02 (2006.01)

(52) U.S. Cl.
CPC ........... *H01M 4/625* (2013.01); *H01M 4/663* (2013.01); *H01M 10/0525* (2013.01); *H01M 2004/028* (2013.01); *H01M 2220/20* (2013.01)

(58) Field of Classification Search
CPC ........ H01M 4/62; H01M 4/623; H01M 4/625; H01M 4/663; H01M 10/052; H01M 10/0525
See application file for complete search history.

(56) References Cited

U.S. PATENT DOCUMENTS

| | | | |
|---|---|---|---|
| 2002/0009639 A1 | 1/2002 | Miyake et al. | |
| 2002/0039680 A1 | 4/2002 | Hwang et al. | |
| 2002/0045102 A1 | 4/2002 | Jung et al. | |
| 2004/0058246 A1 | 3/2004 | Choi et al. | |
| 2012/0119161 A1* | 5/2012 | Son | H01B 1/122 |
| | | | 252/506 |
| 2012/0207994 A1 | 8/2012 | Wang et al. | |
| 2013/0164625 A1 | 6/2013 | Manthiram et al. | |
| 2013/0330619 A1 | 12/2013 | Archer et al. | |
| 2014/0099536 A1* | 4/2014 | Sun | H01M 10/0569 |
| | | | 429/188 |
| 2014/0186522 A1 | 7/2014 | Woo et al. | |
| 2014/0255786 A1 | 9/2014 | Oh et al. | |
| 2015/0372291 A1 | 12/2015 | Ryu et al. | |

FOREIGN PATENT DOCUMENTS

| | | | |
|---|---|---|---|
| JP | 1997-147868 | * | 6/1997 |
| JP | 2000-034110 A | | 2/2000 |
| JP | 2004-095243 A | | 3/2004 |
| JP | 2004-335310 A | | 11/2004 |
| JP | 3670931 B2 | | 7/2005 |
| JP | 2006-92881 A | | 4/2006 |
| JP | 2010-97934 A | | 4/2010 |
| JP | 2012-22935 A | | 2/2012 |
| JP | 2012-156100 | * | 8/2012 |
| JP | 2012-156100 A | | 8/2012 |
| JP | 2013-55006 A | | 3/2013 |
| JP | 2013-214482 A | | 10/2013 |
| JP | 2013-229227 A | | 11/2013 |
| JP | 5623303 B2 | | 11/2014 |
| JP | 2016-009682 A | | 1/2016 |
| KR | 2002-0048447 A | | 6/2002 |
| KR | 10-0358809 B1 | | 10/2002 |
| KR | 10-2004-0026207 A | | 3/2004 |
| KR | 10-2012-0133643 A | | 12/2012 |
| KR | 10-2014-0001935 A | | 1/2014 |
| KR | 10-1384198 B1 | | 4/2014 |
| KR | 10-2014-0086811 A | | 7/2014 |
| KR | 10-2014-0111516 A | | 9/2014 |
| KR | 10-2015-0046861 A | | 5/2015 |

OTHER PUBLICATIONS

European Search Report for Appl. No. 16848971.4 dated Jun. 25, 2018.
International Search Report (PCT/ISA/210) issued in PCT/KR2016/010610, dated Jan. 5, 2017.
Sun et al., "Ruthenium nanocrystals as cathode catalysts for lithium-oxygen batteries with a superior performance", Scientific Reports, vol. 3, No. 2247, Jul. 22, 2013, pp. 1-7.
Written Opinion (PCT/ISA/237) issued in PCT/KR2016/010610, dated Jan. 5, 2017.
Al Salem et al., "Electrocatalytic Polysulfide Traps for Controlling Redox Shuttle Process of Li-S Batteries", Journal of the American Chemical Society, vol. 137, Sep. 2, 2015, pp. 11542-11545, XP055539851.
European Office Action dated Jan. 17, 2019, for European Application No. 16848971.4.

* cited by examiner

CATHODE ACTIVE MATERIAL AND CATHODE COMPRISING METAL NANO PARTICLES, AND LITHIUM-SULFUR BATTERY COMPRISING SAME

TECHNICAL FIELD

This application claims priority to and the benefits of Korean Patent Application No. 10-2015-0134594, filed with the Korean Intellectual Property Office on Sep. 23, 2015, and Korean Patent Application No. 10-2016-0121705, filed with the Korean Intellectual Property Office on Sep. 22, 2016, the entire contents of which are incorporated herein by reference.

The present disclosure relates to a positive electrode active material and a positive electrode comprising metal nano particles, and a lithium-sulfur battery comprising the same, and in particular, to a positive electrode for a lithium-sulfur battery comprising a positive electrode active material of a sulfur-metal catalyst-carbon composite, and a lithium-sulfur battery comprising the same.

BACKGROUND ART

As international interests have recently risen in the global environment, securing future clean energy sources has emerged as an important subject at a national security level as well as in economic aspects. Accordingly, all countries of the world have made much invest on the development of new and renewable energy for replacing fossil fuel. However, current new and renewable energy has many disadvantages compared to traditional energy sources in that economic feasibility is not secured, supply contribution is low, high maintenance costs are required and the like.

In addition, as electronic goods, electronic devices, communication devices and the like have rapidly become smaller and lighter, and necessity of electric vehicles has highly emerged regarding environmental problems, demands for improving performance of secondary batteries used as a power source of these goods have greatly increased. Among these, lithium batteries have received considerable attention as a high performance battery due to their high energy density and high standard electrode potential.

Particularly, lithium-sulfur (Li—S) batteries are a secondary battery using a sulfur series material having sulfur-sulfur (S—S) bonds as a positive electrode active material, and using lithium metal as an anode active material. Sulfur, a main material of a positive electrode active material, has advantages of being very abundant in resources, having no toxicity and having a low atomic weight. Moreover, a lithium-sulfur battery is a most promising battery among batteries that have been developed so far in terms of energy density with lithium metal used as an anode active material having theoretical capacity of 3860 mAh/g and sulfur ($S_8$) used as a positive electrode active material having theoretical capacity of 1675 mAh/g.

During a discharge reaction of a lithium-sulfur (Li—S) battery, an oxidation reaction of lithium occurs in an anode, and a reduction reaction of sulfur occurs in a positive electrode. Sulfur has a cyclic $S_8$ structure before discharge, and electric energy is stored and produced using an oxidation-reduction reaction in which an oxidation number of S decreases as S—S bonds are broken during a reduction reaction (during discharge), and an oxidation number of S increases as S—S bonds are formed again during an oxidation reaction (during charge). During such a reaction, the sulfur is converted to linear-structured lithium polysulfide ($Li_2S_2$, $Li_2S_4$, $Li_2S_6$, $Li_2S_8$) from cyclic $S_8$ by the reduction reaction, and lithium sulfide ($Li_2S$) is finally produced when such lithium polysulfide is completely reduced. By the process of being reduced to each lithium polysulfide, discharge behavior of a lithium-sulfur (Li—S) battery shows discharging voltages gradually unlike lithium ion batteries.

Accordingly, when assuming that sulfur ($S_8$) completely reacts with lithium to lithium polysulfide ($Li_2S$), a discharge product, the theoretical discharging capacity is 1,675 mAh/g-sulfur and the theoretical energy density is 2,600 Wh/kg, which are 3 times to 6 times higher than theoretical discharging capacity of current lithium ion batteries (570 Wh/kg) and currently studied other battery systems (Ni-MH: 450 Wh/kg, Li—FeS: 480 Wh/kg, Li—$MnO_2$: 1,000 Wh/kg, Na—S: 800 Wh/kg). High energy density is caused by high specific capacity of sulfur and lithium. However, high utilization of sulfur and lithium needs to be secured for accomplishing such values.

So far, there have been no examples of successful commercialization as a lithium-sulfur (Li—S) battery system. The reason for unsuccessful commercialization of lithium-sulfur (Li—S) battery is that, first of all, when using sulfur as an active material, utilization representing the amount of sulfur participating in an electrochemical oxidation and reduction reaction in a battery is low with respect to the amount of the introduced sulfur, and, unlike theoretical capacity, extremely low battery capacity is obtained actually.

In addition, elemental sulfur is generally a nonconductor having no electrical conductivity, and therefore, an electrical conductor capable of providing a smooth electrochemical reaction site needs to be used for an electrochemical reaction to occur.

As a conductor material currently used, carbon-based such as Ketjen black, carbon black, Super-P, carbon nanofiber (CNF) and multi-walled carbon nanotubes (MWNT) has been used. The carbon-based has a large specific surface area, which is very advantageous in terms of increasing a contact surface between sulfur and an electrolyte. However, carbon black is amorphous carbon, and therefor has poor lithium ion intercalation characteristics, and sometimes becomes a cause for the occurrences of irreversible capability. Carbon nanotubes are high crystalline carbon and thereby has excellent electrical conductivity, and may perform a role of a path through which sulfur in an electrode react with lithium ions. In addition, carbon nanotubes have a linear mesh structure, and therefore, have structural stability in a sulfur electrode.

A conductor electrically connects an electrolyte and sulfur, and performs a role of a path enabling lithium ions ($Li^+$) dissolved in the electrolyte to migrate to and react with the sulfur. At the same time, the conductor also performs a role of a path for electrons to migrate from a current collector to the sulfur. Accordingly, when the amount of the conductor is not sufficient or the conductor does not properly perform its roles, unreacted portions increase among the sulfur in the electrode resultantly causing a capacity decrease. In addition, this also adversely affects high rate discharge characteristics and charge and discharge cycle life. Accordingly, a proper conductor needs to be added.

As described in U.S. Pat. Nos. 5,523,179 and 5,582,623, positive electrode structures using elemental sulfur known so far have a structure in which sulfur and carbon powder, a conductor, are each independently present and simply mixed in a positive electrode active material layer (mixture). However, in such a structure, the electrode structure is collapsed when sulfur is eluted to an electrolyte in a liquid form as the sulfur becomes polysulfide when charged and discharged, which adversely affects capacity and lifespan characteristics of a lithium-sulfur (Li—S) battery.

PRIOR ART DOCUMENTS

Patent Documents

Japanese Patent No. 3,670,931 "ELECTRODE MATERIAL FOR LITHIUM SECONDARY BATTERY AND LITHIUM SECONDARY BATTERY"

US Patent Application Publication No. 2012-0207994 "CARBON-METAL OXIDE-SULFUR CATHODES FOR HIGH-PERFORMANCE LITHIUM-SULFUR BATTERIES"

DISCLOSURE

Technical Problem

When using sulfur as a positive electrode active material, a lithium-sulfur battery has low utilization of sulfur participating in an electrochemical oxidation-reduction reaction in the battery with respect to the amount of the introduced sulfur, and therefore, unlike theoretical capacity, exhibits extremely low battery capacity actually, and when repeating charge and discharge, has a problem of reducing a lifespan as capacity sharply decreases.

In view of the above, studies for introducing a new positive electrode active material, a binder or the like to a positive electrode for a lithium-sulfur battery have been ongoing. In this regard, Korean Patent Application Publication No. 2002-0048447 discloses a method of using an organic solvent such as dimethylformamide while using polyvinylidene fluoride, polyvinyl acetate, polyvinyl pyrrolidone or the like as a binder, and U.S. Pat. No. 5,919,587 describes a positive electrode active material formed with an electroactive sulfur-containing material including a —S—S—S— residue and an electroactive transition metal chalcogenide surrounding the same. However, such methods have not been able to gain satisfactory outcomes in terms of effects.

The present disclosure has been made in view of the above, and the present disclosure is directed to providing a positive electrode for a lithium-sulfur battery having excellent charge and discharge characteristics and lifespan characteristics, and a lithium-sulfur battery comprising such a positive electrode.

Technical Solution

In view of the above, one embodiment of the present disclosure provides a positive electrode active material for a lithium-sulfur battery comprising metal nano particles, a carbon material to support the metal nano particles therein, and a sulfur series material to locate the carbon material on at least a part of its surface to form a composite. The sulfur series material may be selected from the group consisting of elemental sulfur, organosulfur compounds and carbon-sulfur polymers [$(C_2S_x)_n$, $x=2.5$ to $50$, $n \geq 2$], and as the metal nano particles, one or more types of metals may be selected from the group consisting of ruthenium (Ru), platinum (Pt), nickel (Ni), copper (Cu), iron (Fe) and cobalt (Co).

In one embodiment of the present disclosure, a positive electrode for a lithium-sulfur battery may form a sulfur-carbon composite having a conductor located on at least a part of a surface of the positive electrode active material, or may form a sulfur-metal catalyst-carbon composite having metal nano particles supported in a conductor and located on at least a part of a surface of the positive electrode active material.

Advantageous Effects

A lithium-sulfur battery using a positive electrode comprising metal nano particles according to the present disclosure increases reactivity of sulfur, a positive electrode active material, and increases electrical conductivity of an electrode by the dispersion of the metal nano particles in the electrode so as to increase reactivity and electric capacity of the positive electrode. In addition, battery reaction products such as lithium sulfide ($Li_2S$) are readily decomposed by a catalyst reaction, and therefore, lifespan characteristics can be improved.

MODE FOR DISCLOSURE

Advantages and characteristics of the present application, and methods for accomplishing the same may become obvious when referring to the embodiments described below in detail together with the accompanying drawings. However, the present application may be embodied in many different forms, and should not be construed as being limited to the embodiments described below. Rather, these embodiments make the disclosure of the present application complete and are provided so as to fully convey the scope of the present disclosure to those skilled in the art, and the present application is defined only by the scope of the appended claims.

Unless otherwise defined, all the terms including technical and scientific terms used in the present specification have the same meanings commonly understandable to those skilled in the art relating to the present application. In addition, terms defined in generally used dictionaries are not interpreted excessively unless obviously particularly defined. Hereinafter, the present application will be described in detail.

Positive Electrode Active Material

The present disclosure provides a positive electrode active material for a lithium-sulfur battery forming a composite by comprising metal nano particles, a carbon material to support the metal nano particles therein and a sulfur series material to locate the carbon material on at least a part of its surface.

Figure 1:
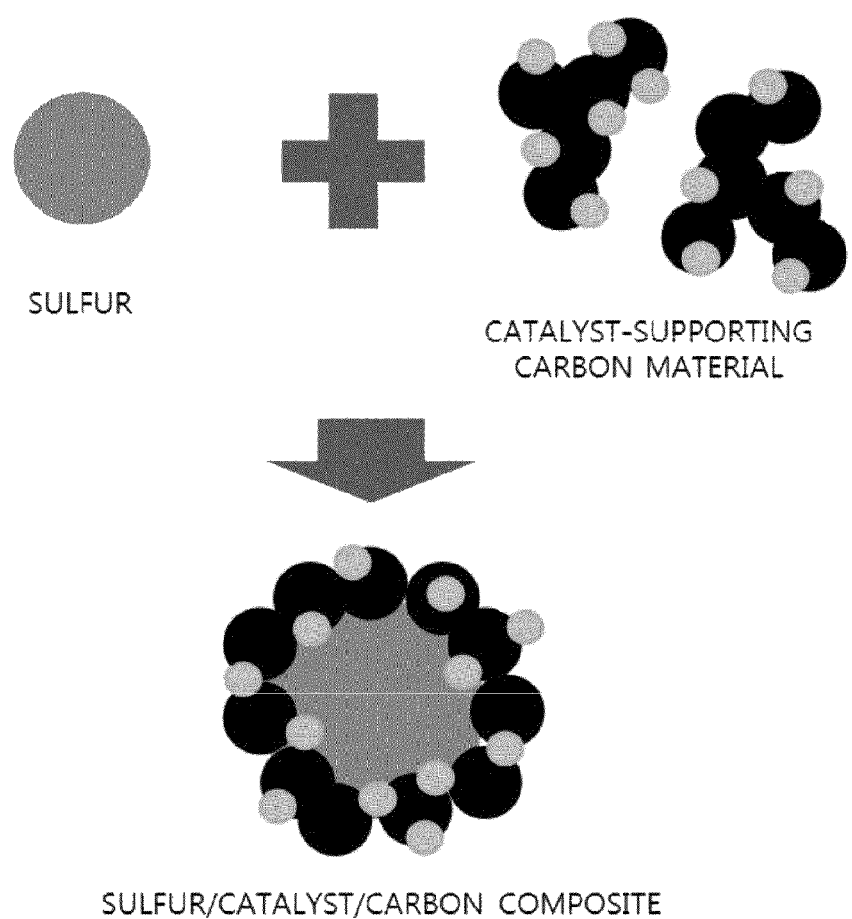
FIG. 1 is a mimetic diagram of a sulfur-metal catalyst-carbon composite as a positive electrode active material of the present disclosure.

As illustrated in FIG. 1, the sulfur series material, the metal nano particles and the carbon particles according to the present disclosure go through complexation and are prepared to a sulfur-metal catalyst-carbon composite, and this is preferably used as a positive electrode active material of a lithium-sulfur battery. When a catalyst is not supported in a composite and is simply mixed with sulfur and carbon particles in such a sulfur-metal catalyst-carbon composite, the catalyst is not uniformly supported in the carbon support and effects obtained from the use of the metal catalyst may not be obtained. In addition, by the metal catalyst having nano level particle sizes, the metal catalyst is mixed at a micron level instead of a nano level due to a property to coagulate with each other when mixed caused by Van der Waals force of a nano particle itself, and in addition thereto, uniform mixing with the sulfur becomes difficult.

Reactivity of sulfur increases by overcoming problems caused by low utilization of sulfur participating in an electrochemical oxidation-reduction reaction in existing lithium-sulfur batteries according to formation of the sulfur-metal catalyst-carbon composite provided in the present disclosure, and reactivity and electric capacity of a positive electrode may be enhanced by increasing electrical conductance of an electrode from the dispersion of the metal nano particles in the electrode. Moreover, battery reaction products such as lithium sulfide ($Li_2S$) are readily decomposed by a catalyst reaction, and therefore, lifespan characteristics may be improved.

Hereinafter, the sulfur series material, the metal nano particles and the carbon material forming the positive electrode active material will be descried.

Metal Nano Particles

The metal nano particles according to the present disclosure facilitates an oxidation-reduction reaction of the positive electrode active material, and such metal nano particles enhance reactivity and electrical conductivity of a positive electrode, and facilitates decomposition of $Li_2S$, a reaction product, after a battery reaction. Reactivity of a catalyst increases as an exposed surface area thereof is larger, and therefore, nano sizes are suitable so as to have a large specific surface area.

Types of the usable metal nano particles are not limited, however, one or more types of metals selected from the group consisting of ruthenium (Ru), platinum (Pt), nickel (Ni), copper (Cu), iron (Fe) and cobalt (Co) may be preferably used. Herein, an average particle diameter of the metal nano particles is preferably from 0.1 nm to 50 nm in terms of providing a proper surface area for the oxidation-reduction reaction.

The content of the metal nano particles is preferably from 0.1% by weight to 10% by weight based on the total weight of the positive electrode active material for a lithium-sulfur battery. When the content is less than the above-mentioned range, a role of a catalyst may not be expected, and when the content is greater than the above-mentioned range on the contrary, battery performance declines, and therefore, the content is properly controlled within the above-mentioned range.

Carbon Material

The carbon material according to the present disclosure is a conductor comprising carbon particles, and may be used as a sulfur-carbon composite in a form of the carbon particles being located in a part or all of the sulfur series material, a positive electrode active material. Sulfur itself is close to a nonconductor, and therefore, in order to be used as the positive electrode active material, the sulfur-carbon composite may be prepared using a method such as wrapping, coating or impregnating sulfur with a material capable of providing conductivity to the sulfur. The carbon material performs a role of suppressing lithium polysulfide elution to an electrolyte caused by a reduction reaction as well as providing conductivity to sulfur.

The carbon material comprises carbon particles having conductivity, and one or more types selected from among graphite-based materials such as KS6; carbon black-based materials such as Super-P, denka black, acetylene black, Ketjen black, channel black, furnace black, lamp black, thermal black and carbon black; carbon derivatives such as fullerene; and conductive fibers such as carbon fiber may be used, however, the carbon material is not limited thereto.

The content of the carbon material is preferably from 5% by weight to 50% by weight based on the total weight of the positive electrode active material for a lithium-sulfur battery. When the content is less than the above-mentioned range, sufficient electrical conductivity may not be provided to a sulfur series material, and when the content is greater than the above-mentioned range on the contrary, sulfur utilization decreases, and therefore, the content is properly controlled within the above-mentioned range.

Sulfur Series Material

The positive electrode active material according to the present disclosure comprises a sulfur series material, and the sulfur series material may be one or more selected from the group consisting of elemental sulfur, organosulfur compounds and carbon-sulfur polymers. The carbon-sulfur polymer ($(C_2S_x)_n$: x=2.5 to 50, n≥2) and the like may be used, however, the sulfur series material is not limited thereto.

The content of the sulfur series material is preferably from 40% by weight to 90% by weight based on the total weight of the positive electrode active material for a lithium-sulfur battery. When the content is less than the above-mentioned range, a role of an active material may not be expected, and when the content is greater than the above-mentioned range on the contrary, the content of the metal nano particles and the content of the carbon material relatively decrease, and therefore, the content is properly controlled within the above-mentioned range.

Positive Electrode

The sulfur-metal catalyst-carbon composite described above is a positive electrode composition for a lithium-sulfur battery, and may be prepared to a positive electrode for a lithium-sulfur battery further comprising a conductor, a binder, a solvent and other materials to be described below through known preparation methods.

Herein, the sulfur-metal catalyst-carbon composite may be included in 50% by weight to 95% by weight based on the total weight of the positive electrode composition. When the content is less than the above-mentioned range, it may be difficult to obtain functions as an electrode, and when the content is greater than the above-mentioned range on the contrary, battery performance declines, and therefore, the content is properly controlled within the above-mentioned range.

Hereinafter, the conductor, the binder, the solvent and the other materials forming the positive electrode composition will be described.

Conductor

The conductor is essential for providing conductivity to sulfur, a nonconductor, as the positive electrode active material, and such a conductor performs a role of enabling electrons to smoothly migrate in an electrode. The positive electrode active material comprises a carbon material as described above in the present disclosure, and therefore, a separate conductor may not be added, but may be added with a purpose of facilitating electron migration in an electrode.

Such a conductor is not particularly limited as long as it has excellent conductivity and is capable of providing a large surface area without inducing chemical changes in a battery, and one or more types selected from among graphite-based materials such as KS6; carbon black-based materials such as Super-P, denka black, acetylene black, Ketjen black, channel black, furnace black, lamp black, thermal black and carbon black; carbon derivatives such as fullerene; conductive fibers such as carbon fiber or metal fiber; metal powders such as fluorinated carbon, aluminum and nickel powders; and conductive polymers such as polyaniline, polythiophene, polyacetylene and polypyrrole.

Binder

The binder for favorably attaching the positive electrode active material to a current collector should be well dissolved in a solvent, and the binder should not only constitute a conductive network between the positive electrode active material and the conductive material, but also have an ability to impregnate the electrolyte properly.

All binders known in the art may be used as the binder capable of being used in the present disclosure, and specific examples thereof may include one or more types of mixtures or copolymers selected from the group consisting of fluorine resin-based binders including polyvinylidene fluoride (PVdF) or polytetrafluoroethylene (PTFE); rubber-based binders including styrene-butadiene rubber, acrylonitrile-butadiene rubber or styrene-isoprene rubber; cellulose-based binders including carboxymethyl cellulose (CMC), starch, hydroxypropyl cellulose or regenerated cellulose; polyalcohol-based binders; polyolefin-based binders including polyethylene or polypropylene; polyimide-based binders, polyester-based binders and silane-based binders, but are not limited thereto.

The content of the binder resin may be from 0.5% by weight to 30% by weight based on the total weight of the positive electrode for a lithium-sulfur battery, but is not limited thereto. When the content of the binder resin is less than 0.5% by weight, physical properties of the positive electrode decline and the positive electrode active material and the conductor may be fallen, and when the content is greater than 30% by weight, a ratio of the active material and the conductor relatively decreases in the positive electrode leading to a battery capacity decrease.

Solvent

The solvent for preparing the positive electrode composition for a lithium-sulfur battery in a slurry state needs to be readily dried, and solvents capable of maintaining the positive electrode active material and the conductor in a dispersed state without dissolving them while properly dissolving the binder are most preferred. When the solvent dissolves the positive electrode active material, sulfur sinks in the slurry due to high gravity of the sulfur (D=2.07) in the slurry, and the sulfur is driven into a current collector when coating causing a problem in the conductive network, which tends to cause a problem in the battery operation.

Water or organic solvents may be used as the solvent according to the present disclosure, and as the organic solvent, an organic solvent including one or more types selected from the group consisting of dimethylformamide, isopropyl alcohol, acetonitrile, methanol, ethanol and tetrahydrofuran may be used.

Others

The positive electrode composition for a lithium-sulfur battery of the present disclosure may further comprise additives for increasing binding strength of the binder or a surfactant for properly dispersing the positive electrode active material, the binder and the conductor in the organic solvent and for strengthening viscosity.

Lithium-Sulfur Battery

As one embodiment of the present disclosure, the lithium-sulfur battery may comprise the positive electrode for a lithium-sulfur battery described above; an anode including lithium metal or a lithium alloy as an anode active material; a separator provided between the positive electrode and the anode; and an electrolyte impregnated in the anode, the positive electrode and the separator, and including a lithium salt.

Anode

The anode may use, as an anode active material, materials capable of reversibly intercalating or deintercalating lithium ions ($Li^+$), materials capable of reversibly forming a lithium-containing compound by reacting with lithium ions, lithium metal or lithium alloys. Examples of the material capable of reversibly intercalating or deintercalating lithium ions (Li') may include crystalline carbon, amorphous carbon or mixtures thereof. Examples of the material capable of reversibly forming a lithium-containing compound by reacting with lithium ions ($Li^+$) may include tin oxide, titanium nitrate or silicon. Examples of the lithium alloy may include alloys of lithium and metals selected from the group consisting of Na, K, Rb, Cs, Fr, Be, Mg, Ca, Sr, Ba, Ra, Al and Sn.

In addition, sulfur used as the positive electrode active material may be converted to an inactive material and attached on the lithium anode surface while charging and discharging a lithium-sulfur battery. Such inactive sulfur means sulfur in a state of gone through various electrochemical or chemical reactions and not capable of participating in an electrochemical reaction of a positive electrode any more, and the inactive sulfur formed on the lithium anode surface has an advantage of performing a role of a protective layer of the lithium anode. Accordingly, the lithium metal and the inactive sulfur formed on this lithium metal, for example, lithium sulfide, may also be used as the anode.

In addition to the anode active material, the anode of the present disclosure may further include a pretreatment layer formed with lithium ion conductive materials and a lithium metal protective layer formed on the pretreatment layer.

Separator

The separator provided between the positive electrode and the anode separates and insulates the positive electrode and the anode, and enables lithium ion transport between the positive electrode and the anode, and may be formed with porous nonconductive or insulating materials. Such a separator is an insulator having high ion permeability and mechanical strength, and may be an independent member such as a thin membrane or film or may also be a coating layer added on the positive electrode and/or the anode. In addition, when a solid electrolyte such as a polymer is used as an electrolyte, the solid electrolyte may also serve as the separator.

The separator generally has a pore diameter of 0.01 µm to 10 µm, and generally has a thickness of 5 µm to 300 µm preferably, and as such a separator, glass electrolytes, polymer electrolytes, ceramic electrolytes or the like may be used. For example, olefin-based polymers such as chemically resistant and hydrophobic polypropylene, sheets or non-woven fabrics made of glass fiber, polyethylene or the like, kraft paper and the like are used. Typical examples thereof commercially available currently include Celgard series (Celgard® 2400, 2300 products of Hoechest Celanese Corp.), polypropylene separator (products of Ube Industries Ltd. or products of Pall RAI Corporation), polyethylene series (Tonen or Entek), or the like.

The electrolyte separator in a solid state may also include a non-aqueous organic solvent in less than approximately 20% by weight, and in this case, a proper gel-forming compound (gelling agent) may be further included for decreasing fluidity of the organic solvent. Typical examples of such a gel-forming compound may include polyethylene oxide, polyvinylidene fluoride, polyacrylonitrile or the like.

Electrolyte

The electrolyte impregnated in the anode, the positive electrode and the separator contains a lithium salt, and a non-aqueous organic solvent, an organic solid electrolyte, an inorganic solid electrolyte and the like are used.

The lithium salt of the present disclosure is a material to be well dissolved in a non-aqueous organic solvent, and examples thereof may include one or more selected from the group consisting of LiCl, LiBr, LiI, LiClO$_4$, LiBF$_4$, LiB$_{10}$Cl$_{10}$, LiB(Ph)$_4$, LiPF$_6$, LiCF$_3$SO$_3$, LiCF$_3$CO$_2$, LiAsF$_6$, LiSbF$_6$, LiAlCl$_4$, LiSO$_3$CH$_3$, LiSO$_3$CF$_3$, LiSCN, LiC(CF$_3$SO$_2$)$_3$, LiN(CF$_3$SO$_2$)$_2$, chloro borane lithium, lower aliphatic lithium carboxylate, 4-phenyl lithium borate, and imide.

The concentration of the lithium salt may be from 0.2 M to 2 M, specifically from 0.6 M to 2 M and more specifically from 0.7 M to 1.7 M depending on various factors such as precise compositions of the electrolyte mixture, solubility of the salt, conductivity of the dissolved salt, conditions of battery charge and discharge, operating temperatures and other factors known in the fields of lithium batteries. When the concentration is less than 0.2 M, conductivity of the electrolyte decreases declining electrolyte performance, and when the concentration is greater than 2 M, viscosity of the electrolyte increases reducing lithium ion (Li$^+$) mobility.

The non-aqueous organic solvent needs to properly dissolve lithium salts, and examples of the non-aqueous organic solvent of the present disclosure may include non-protic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxyfranc, 2-methyl tetrahydrofuran, dimethyl sulfoxide, 1,3-dioxolane, 4-methyl-1,3-dioxene, diethyl ether, formamide, dimethylformamide, dioxolane, acetonitrile, nitromethane, methyl formate, methyl acetate, triester phosphate, trimethoxymethane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate, and the organic solvent may be one or a mixture of two or more solvents.

Examples of the organic solid electrolyte may include polyethylene derivatives, polyethylene oxide derivatives, polypropylene oxide derivatives, ester phosphate polymers, polyagitation lysine, polyester sulfide, polyvinyl alcohol, polyvinylidene fluoride, polymers including an ionic dissociation group, and the like.

Examples of the inorganic solid electrolyte of the present disclosure may include nitrides, halides, sulfates and the like of Li such as Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH and Li$_3$PO$_4$—Li$_2$S—SiS$_2$.

To the electrolyte of the present disclosure, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxyethanol, aluminum trichloride or the like may be added for the purposes of improving charge and discharge characteristics, flame retardancy and the like. When necessary, halogen-containing solvents such as carbon tetrachloride and ethylene trifluoride may be further included in order to provide noninflammability, and carbon dioxide gas may be further included for enhancing high temperature storage characteristics, and fluoro-ethylene carbonate (FEC), propene sultone (PRS), fluoro-propylene carbonate (FPC) and the like may be further included.

The electrolyte may be used as a liquid electrolyte and may also be used as an electrolyte separator form in a solid state. When used as a liquid electrolyte, a separator formed with porous glass, plastics, ceramics, polymers or the like is further included as a physical separator having a function of physically separating the electrodes.

Hereinafter, the present disclosure will be described in detail through preferred examples. First, as a most preferred example of the present disclosure, a method for preparing a positive electrode for a lithium-sulfur battery using a sulfur-metal catalyst-carbon composite obtained by preparing a metal nano particle-supporting conductor (carbon material), and then locating this on at least a part of a positive electrode active material surface is provided.

<Preparation Example 1> Preparation of Sulfur-Metal Catalyst-Carbon Composite

A carbon material (KB600J) was treated in HNO$_3$ for 2 hours at 110° C., and then washed and dried for 24 hours. The dried carbon material was treated in RuCl$_3$.nH$_2$O, a metal catalyst precursor, and NaHCO$_3$ for 15 hours for washing, and dried for 19 hours at 150° C. to prepare a ruthenium (Ru)-supporting carbon material. The ruthenium (Ru)-supporting carbon material was mixed with sulfur particles through a ball milling process to prepare a sulfur-metal catalyst-carbon composite in which the ruthenium (Ru)-supported carbon material was wrapped on the sulfur (S) particles. Herein, a weight ratio of the sulfur:metal catalyst:carbon material in the composite was 5:30:65.

<Preparation Example 2> Preparation of Sulfur-Metal Catalyst-Carbon Composite

A composite was prepared in the same manner as above using ruthenium oxide (RuO$_2$) particles.

Result

Figure 2:
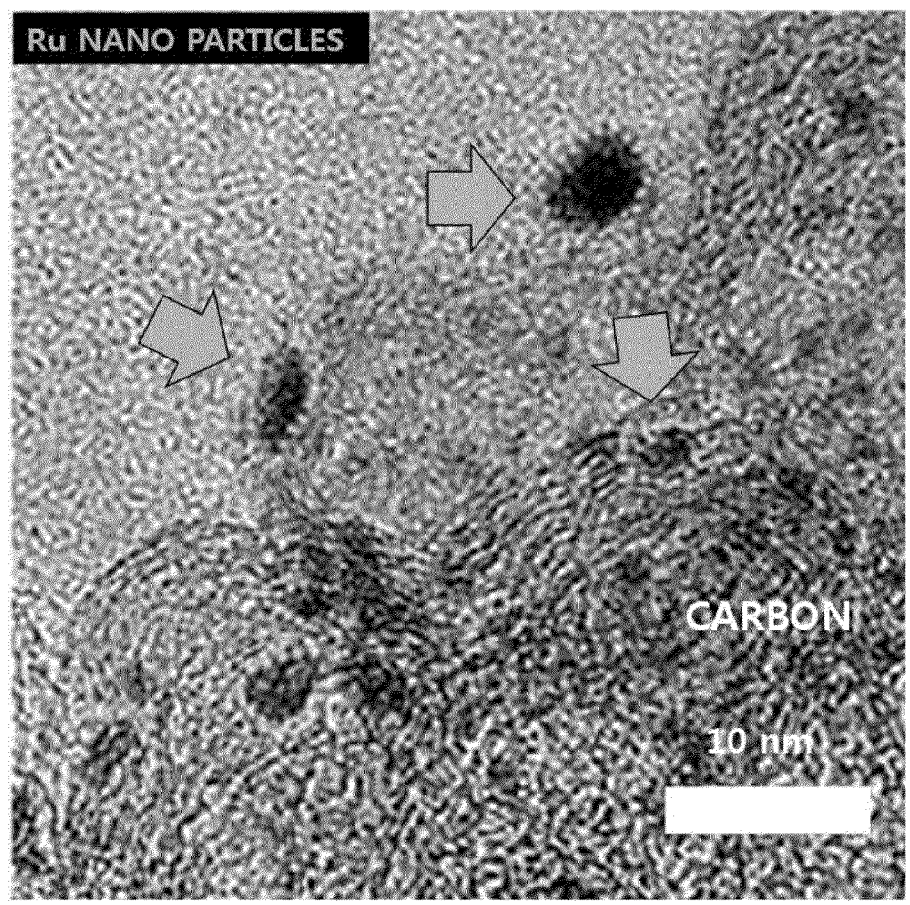
FIG. 2 is a TEM image of a ruthenium (Ru) nano particle-supporting carbon material as one embodiment of the present disclosure.
Figure 3:
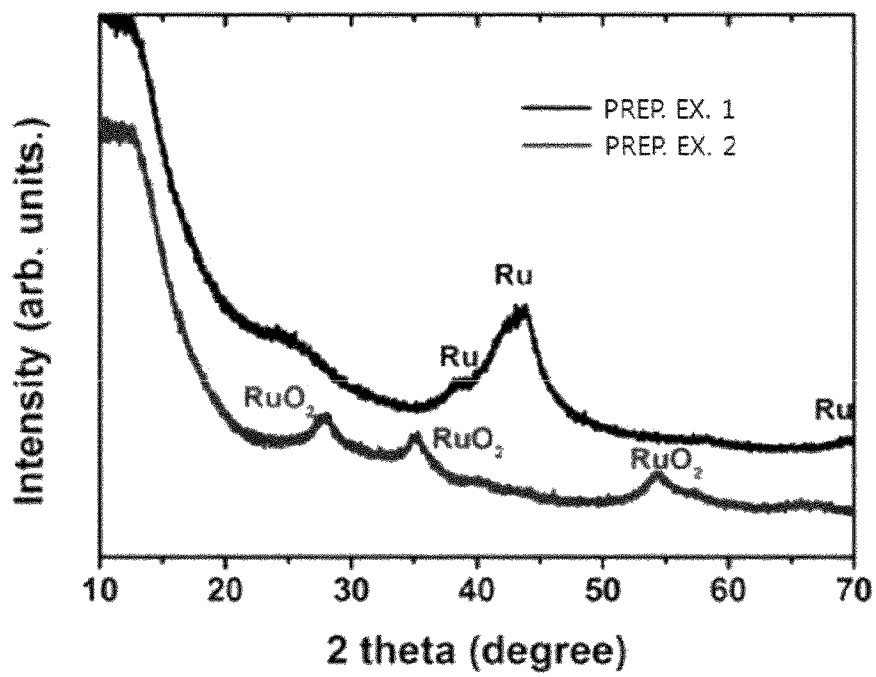
FIG. 3 shows XRD analysis data of a ruthenium (Ru) nano particle-supporting carbon material as one embodiment of the present disclosure.

As shown in FIG. 2, the ruthenium (Ru) nano particle-supporting carbon particles of Preparation Example 1 were identified through a TEM image. In addition, as shown in FIG. 3, it was identified that the components of the metal particles supported in the carbon materials of Preparation Example 1 and Preparation Example 2 were ruthenium (Ru)

and ruthenium oxide ($RuO_2$), respectively, through data measuring powder X-ray diffraction (XRD) patterns.

Figure 4:
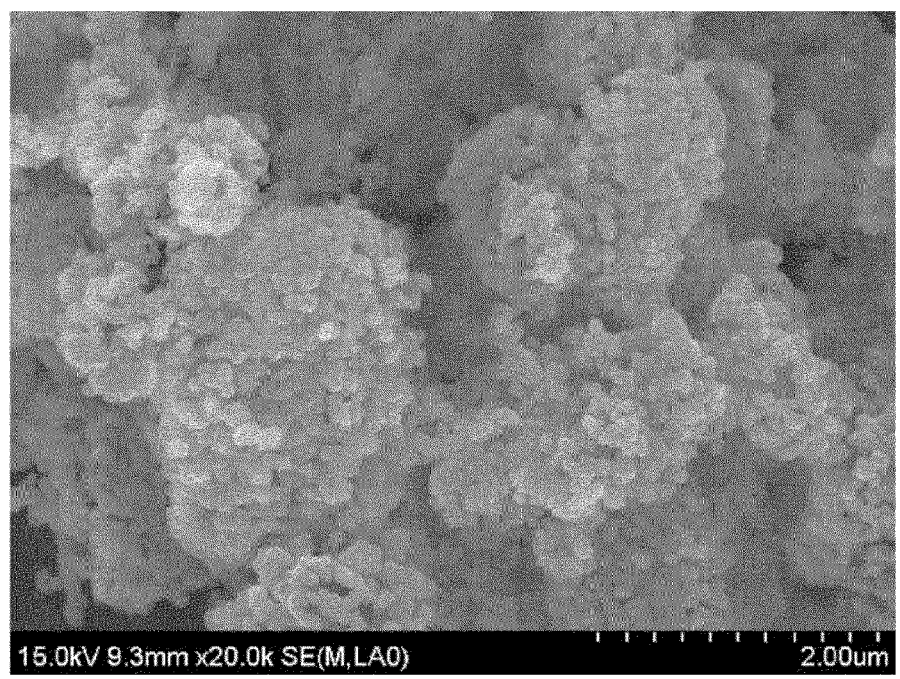
FIG. 4 is a SEM image of a sulfur-ruthenium (Ru) catalyst-carbon composite as one embodiment of the present disclosure.
Figure 5:
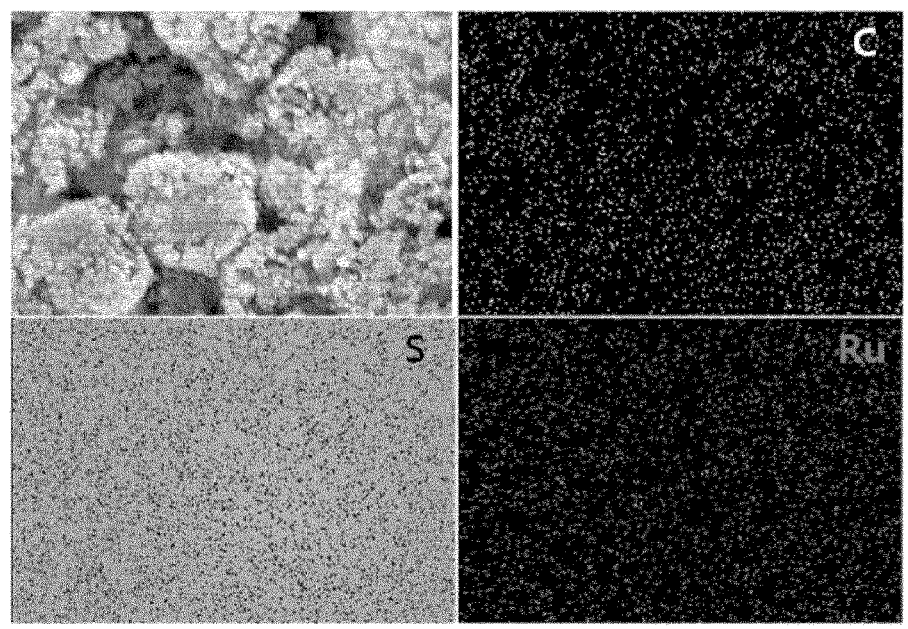
FIG. 5 is an EDX analysis image of a sulfur-ruthenium (Ru) catalyst-carbon composite as one embodiment of the present disclosure.

Constituents of the sulfur-metal catalyst-carbon composite prepared in Preparation Example 1 were observed by a scanning electron microscope (SEM) provided with an energy dispersive X-ray (EDX) analyzer, and the results are shown in FIG. 4 and FIG. 5. Through FIG. 4, the sulfur series material covered with the metal nano particle-supporting carbon composite was identified, and through FIG. 5, it was identified that the sulfur-metal catalyst-carbon composite was composed of sulfur (S), carbon (C) and ruthenium (Ru) elements.

<Example 1> Manufacture of Lithium-Sulfur Battery Including Sulfur-Metal Catalyst-Carbon Composite as Positive Electrode Active Material After preparing positive electrode slurry by adding a positive electrode mixture having a composition of 80% by weight of the composite of Preparation Example 1, 20% by weight of carbon black (carbon material), and 10% by weight of PVDF (binder) to N-methyl-2-pyrrolidone (NMP), a solvent, the slurry was coated on an aluminum current collector to prepare a positive electrode for a lithium-sulfur battery.

Lithium foil having a thickness of approximately 150 μm was used as an anode, a mixed liquid electrolyte of dimethoxyethane, dioxolane and diglyme (volume ratio 14:65:21) dissolving 1 M $LiN(SO_2CF_3)_2$ was used as a liquid electrolyte, and 16 micron polyolefin was used as a separator to manufacture a lithium-sulfur battery.

<Comparative Example 1> Manufacture of Lithium-Sulfur Battery Including Sulfur-Carbon Composite as Positive Electrode Active Material After preparing positive electrode slurry by adding a positive electrode mixture having a composition of 90% by weight of a sulfur-carbon composite and 10% by weight of PVDF (binder) to N-methyl-2-pyrrolidone (NMP), a solvent, the slurry was coated on an aluminum current collector to prepare a positive electrode. After that, an anode, a liquid electrolyte and a separator were used in the same manner as in Example 1 to manufacture a lithium-sulfur battery.

<Comparative Example 2> Manufacture of Lithium-Sulfur Battery Simply Mixing Sulfur-Carbon Composite and Metal Nano Particles as Positive Electrode Active Material After preparing positive electrode slurry by adding a positive electrode mixture having a composition of 85% by weight of a sulfur-carbon composite, 5% by weight of ruthenium (Ru) and 10% by weight of PVDF (binder) to N-methyl-2-pyrrolidone (NMP), a solvent, the slurry was coated on an aluminum current collector to prepare a positive electrode. After that, an anode, a liquid electrolyte and a separator were used in the same manner as in Example 1 to manufacture a lithium-sulfur battery.

<Test Example 1> Charge and Discharge Test

Figure 6:
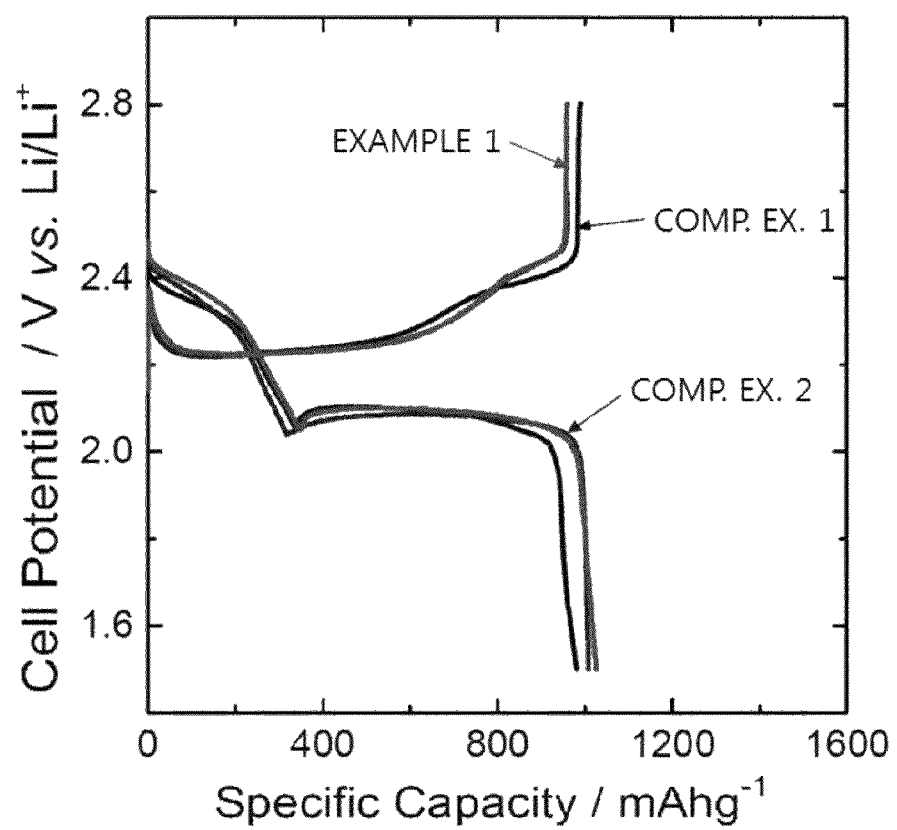
FIG. 6 shows data analyzing charge and discharge characteristics of a positive electrode for a lithium-sulfur battery comprising a sulfur-ruthenium (Ru) catalyst-carbon composite as one embodiment of the present disclosure.

For the lithium-sulfur batteries manufactured in Example 1, Comparative Example 1 and Comparative Example 2, changes in the charge and discharge characteristics were tested using a charge and discharge measuring device. For the obtained batteries, initial capacity was examined under a 0.1 C/0.1 C charge/discharge condition, and the results are shown in FIG. 6.

<Test Example 2> Lifespan Test

Figure 7:
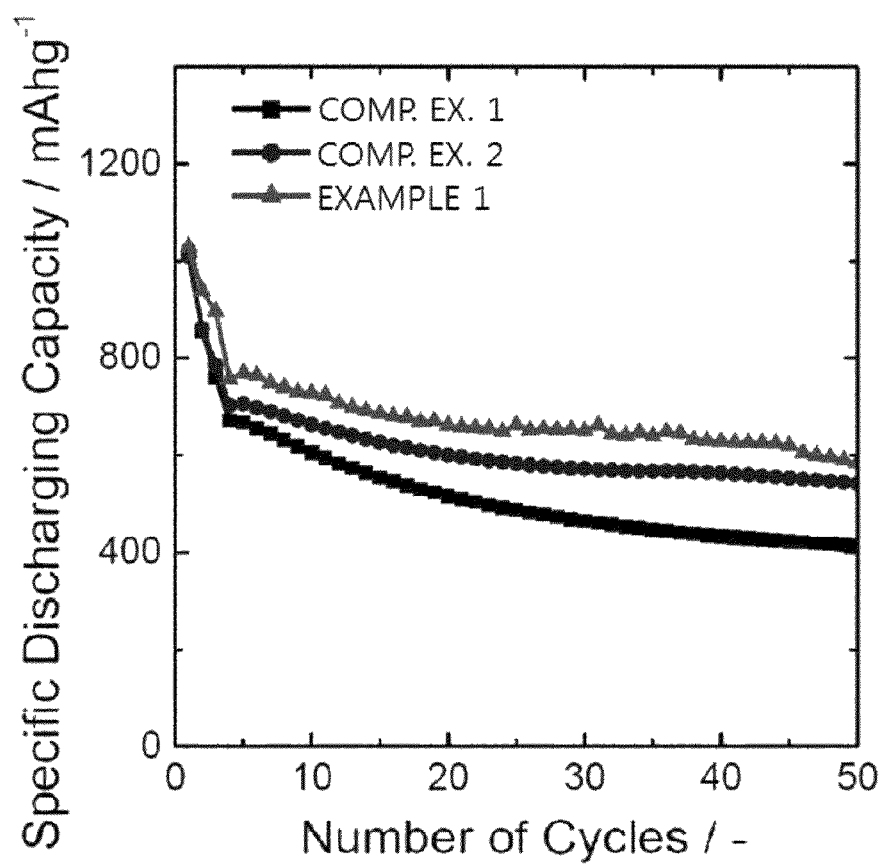
FIG. 7 shows data analyzing lifespan characteristics of a positive electrode for a lithium-sulfur battery comprising a sulfur-ruthenium (Ru) catalyst-carbon composite as one embodiment of the present disclosure.

Using a charge and discharge measuring device, a capacity retention rate (%) at the $50^{th}$ cycle with respect to initial capacity was measured by each repeating 50 cycles of charge and discharge with 0.1 C/0.1 C charge/discharge for the first 2 cycles, and then with 0.3 C/0.5 C charge/discharge thereafter, and the results are shown in FIG. 7.

Result

FIG. 6 and FIG. 7 show data analyzing charge and discharge characteristics and lifespan characteristics of the positive electrode for a lithium-sulfur battery comprising ruthenium (Ru) nano particle-supporting carbon particles as one embodiment of the present disclosure. The reference electrode is evaluating characteristics after preparing an electrode using a general carbon-sulfur composite as a positive electrode active material. It was identified that the lithium-sulfur battery positive electrode comprising the metal nano particle catalyst had increased initial discharging capacity compared to the comparative general lithium-sulfur battery positive electrode, and lifespan characteristics were also improved. In addition, Comparative Example 1 and Comparative Example 2 exhibited low charge and discharge characteristics and lifespan characteristics compared to Example 1, and accordingly, it was identified that Example 1 in which metal nano particles are supported in carbon particles exhibited excellent charge and discharge characteristics and lifespan characteristics compared to Comparative Example 1 that does not comprise metal nano particles and Comparative Example 2 simply mixing metal nano particles and carbon particles.

The present application provides a battery module comprising the lithium-sulfur battery as a unit cell. Specifically, the battery module may be used as a power supply of electric vehicles, hybrid electric vehicles, plug-in hybrid electric vehicles or power storage devices.

The invention claimed is:

1. A positive electrode active material for a lithium-sulfur battery comprising:
   metal nano particles;
   carbon materials to complex the metal nano particles therein; and
   a sulfur series material to locate the carbon material on at least a part of its surface to form a composite,
   wherein the metal nano particles are ruthenium nano particles.

2. The positive electrode active material for a lithium-sulfur battery of claim 1, wherein the metal nano particles have an average particle diameter of 0.1 nm to 50 nm.

3. The positive electrode active material for a lithium-sulfur battery of claim 1, wherein a content of the metal nano particles is from 0.1% by weight to 10% by weight based on a total weight of the positive electrode active material for a lithium-sulfur battery.

4. The positive electrode active material for a lithium-sulfur battery of claim 1, wherein the carbon material is one or more types selected from the group consisting of graphite-based materials, carbon black-based materials and carbon derivatives.

5. The positive electrode active material for a lithium-sulfur battery of claim 1, wherein a content of the carbon material is from 5% by weight to 50% by weight based on a total weight of the positive electrode active material for a lithium-sulfur battery.

6. The positive electrode active material for a lithium-sulfur battery of claim 1, wherein the carbon materials of the positive electrode active material are complexing the metal nano particles using any one method of wrapping, coating or impregnation.

7. The positive electrode active material for a lithium-sulfur battery of claim 1, wherein the sulfur series material comprises one or more selected from the group consisting of elemental sulfur, organosulfur compounds and carbon-sulfur polymers.

8. The positive electrode active material for a lithium-sulfur battery of claim 1, wherein a content of the sulfur series material is from 40% by weight to 90% by weight based on a total weight of the positive electrode active material for a lithium-sulfur battery.

9. A positive electrode for a lithium-sulfur battery comprising the positive electrode active material of claim 1.

10. The positive electrode for a lithium-sulfur battery of claim 9, further comprising a conductor for providing electrical conductivity.

11. The positive electrode for a lithium-sulfur battery of claim 10, wherein the conductor is one or more types selected from the group consisting of graphite-based materials, carbon black-based materials, carbon derivatives, conductive fibers, metal powders and conductive polymers.

12. The positive electrode for a lithium-sulfur battery of claim 9, further comprising a binder for attaching the positive electrode active material to a current collector.

13. The positive electrode for a lithium-sulfur battery of claim 12, wherein the binder is one or more types of mixtures or copolymers selected from the group consisting of fluorine resin-based binders, rubber-based binders, cellulose-based binders, polyalcohol-based binders, polyolefin-based binders, polyimide-based binders, polyester-based binders and silane-based binders.

14. A lithium-sulfur battery comprising:
a positive electrode comprising sulfur particles and metal nano particles;
an anode comprising lithium metal or a lithium alloy; and
an electrolyte comprising a lithium salt,
wherein the positive electrode is the positive electrode for a lithium-sulfur battery of claim 9.

* * * * *